(12) United States Patent
Hermann

(10) Patent No.: US 7,404,259 B2
(45) Date of Patent: Jul. 29, 2008

(54) OPTICAL POSITION MEASURING INSTRUMENT

(75) Inventor: Michael Hermann, Tacherting (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 35 days.

(21) Appl. No.: 11/493,086

(22) Filed: Jul. 26, 2006

(65) Prior Publication Data
US 2007/0028476 A1 Feb. 8, 2007

(30) Foreign Application Priority Data
Aug. 2, 2005 (DE) .................. 10 2005 036 180

(51) Int. Cl.
*G01B 11/00* (2006.01)
(52) U.S. Cl. ....................................... 33/707
(58) Field of Classification Search .................. 33/706, 33/707
See application file for complete search history.

(56) References Cited
U.S. PATENT DOCUMENTS
4,799,798 A * 1/1989 Erb ............................ 356/618
4,991,125 A * 2/1991 Ichikawa ................. 250/237 G
5,237,391 A * 8/1993 Huggins ...................... 356/617
5,456,020 A * 10/1995 Kellner ......................... 33/707
6,178,653 B1 * 1/2001 Griffith et al. .................. 33/555

FOREIGN PATENT DOCUMENTS
EP 0 547 270 B1 5/1995

\* cited by examiner

*Primary Examiner*—Christopher W Fulton
(74) *Attorney, Agent, or Firm*—Brinks Hofer Gilson & Lione

(57) ABSTRACT

A position measuring instrument for detecting a relative position, the position measuring instrument including a scale having a measuring graduation extending in a measuring direction and a scanning unit that can be moved in the measuring direction in relation to the scale so as to generate a resultant scanning signal, wherein the scanning unit has a scanning graduation arranged on a side of the scanning unit. Either the measuring graduation or the scanning graduation includes graduation areas located periodically in the measuring direction, the graduation areas extend perpendicular to the measuring direction along an extension direction, and the graduation areas, along the extension direction, have differentiable contour shapes, which are dimensioned such that unwanted harmonic components can be eliminated from the resultant scanning signal by way of them.

14 Claims, 3 Drawing Sheets

OPTICAL POSITION MEASURING INSTRUMENT

Applicant claims, under 35 U.S.C. § 119, the benefit of priority of the filing date of Aug. 2, 2005 of a German patent application, copy attached, Serial Number 10 2005 036 180.3, filed on the aforementioned date, the entire contents of which is incorporated herein by reference.

BACKGROUND

1. Field of Invention

The present invention relates to an optical position measuring instrument for detecting the relative position of a scanning unit, as well as a scale, which can be moved in at least one measuring direction in relation to it, wherein the scale includes at least one measuring graduation extending in the measuring direction, and at least one scanning graduation is arranged on the side of the scanning unit.

2. Discussion of Related Art

In known incremental optically based position measuring instruments, a scale with a periodic measuring graduation is typically scanned by a likewise periodic scanning graduation. The latter is arranged together with further components, such as a light source and a detector array, in a scanning unit that is movable relative to the scale in at least one measuring direction. In the ideal case, there is an exact sinusoidal scanning signal or incremental signal, which can be further processed—or further subdivided—in suitable follow-up electronic devices using known interpolation processes. Typically, the form of the detected scanning signals that actually results, however, deviates more or less sharply from the ideal sinusoidal form. The most various causes may be responsible for this, such as deviations in the graduation periods on the scale and/or on the scanning side from ideal conditions, imprecise edges of the graduation markings, and so forth. The scanning signals that actually result are therefore in practice burdened by harmonics, which in particular can impair the further processing of the signals in the form of the interpolation. It is therefore a fundamental goal to minimize the harmonic content of the scanning signals as much as possible.

Such harmonics result in connection with the most various optical scanning principles, or in other words both in conjunction with shadow-casting scanning principles and in the case of high-resolution, interferential scanning principles, or so-called grating-interferometric position measuring instruments. Harmonic filtering approaches for the last-named grating-interferometric position measuring instruments have already been disclosed in EP 547 270 B1. This reference proposes various variants for harmonic filtration, in each of which a specially embodied graduation structure is provided on the side of the scanned measuring graduation. Thus, the graduation areas located periodically in the measuring direction have a defined periodic transversal structure. To that end, the graduation areas have modulated contour shapes along their longitudinal extension direction. The exemplary embodiment, shown in FIG. 5 of the aforementioned reference, of this kind of measuring graduation is also known as a "fish-eye grating". Although a measuring graduation embodied in this way assures adequate harmonic filtration, it nevertheless makes stringent demands with regard to the proposed contour shapes of the production of the applicable measuring graduation structures. For instance, in the embodiment of the contour shapes that taper to a point, very fine structures must be exactly transferred, which makes for complicated and expensive production of the measuring graduation. This is all the more serious if in this kind of harmonic filtration the filtering structure is not limited to a small scanning plate but instead is provided on the side of the measuring graduation. The measuring graduation may then have a length of several meters, so that for this reason if no other, stringent demands must be made of the homogeneity of the production process for the measuring graduation.

OBJECTS AND SUMMARY OF THE INVENTION

It is an object of the present invention to disclose a capability of filtering unwanted harmonics out of the resultant scanning signals in connection with an optical position measuring instrument. The simplest possible production of the graduation structure by way of which the harmonic filtration is accomplished is desirable, besides extensive elimination of the most-severely interfering harmonics from the scanning signals.

This object is attained according to the present invention by a position measuring instrument for detecting a relative position, the position measuring instrument including a scale having a measuring graduation extending in a measuring direction and a scanning unit that can be moved in the measuring direction in relation to the scale so as to generate a resultant scanning signal, wherein the scanning unit has a scanning graduation arranged on a side of the scanning unit. Either the measuring graduation or the scanning graduation includes graduation areas located periodically in the measuring direction, the graduation areas extend perpendicular to the measuring direction along an extension direction, and the graduation areas, along the extension direction, have differentiable contour shapes, which are dimensioned such that unwanted harmonic components can be eliminated from the resultant scanning signal by way of them.

According to the present invention, it is now provided that the graduation areas used for harmonic filtration on the scale or scanning side that extends perpendicular to the measuring direction are embodied geometrically such that the graduation areas have differentiable contour shapes in their extension direction. The contour shapes are dimensioned such that by them unwanted harmonic components can be eliminated from the resultant scanning signals.

Besides good suppression of unwanted harmonics in the scanning signals, it must be stated as a definitive advantage of the embodiment according to the present invention that the applicable graduation structures can be produced relatively simply in manufacturing terms with differentiable contour shapes. For instance, it suffices to approximate the contour shape of the graduation areas that is required for the filtering by a few support points. The contour shapes are then suitable rounded by the production lithography process. In particular, it is no longer necessary to create sharp points or edges in the shape of the contour.

The provisions according to the present invention may be applied both to the scanning graduation and to the measuring graduation.

In an advantageous embodiment, the position measuring instrument of the present invention is embodied as a high-resolution, grating-interferometric or interferential incident light position measuring instrument for linear measurements, in which the graduation areas are suitably designed on the measuring graduation.

It is understood that the position measuring instrument of the present invention can also be adapted for rotational measurements or embodied as a transmitted light system, and so forth.

Further details and advantages of the present invention will be explained in the ensuing description of exemplary embodiments in conjunction with the drawings.

DETAILED DESCRIPTION OF THE PREFERRED EMBODIMENTS

A first embodiment of a position measuring instrument of the present invention will now be described in conjunction with FIG. 1. For the sake of better clarity, the scanning beam path is shown here in a view.

The position measuring instrument of the present invention includes a scale with a measuring graduation 10 and also includes a scanning unit with further scanning-relevant components, which is displaceable relative to the measuring graduation 10 in at least one measuring direction x. The various components of the scanning unit are located for instance in a suitable housing, which is not shown in FIG. 1 for the sake of greater clarity. In the present example, all the other components in FIG. 1, except for the measuring graduation 10, are part of the scanning unit.

The objects whose relative position is to be determined with the aid of the position measuring instrument of the present invention are coupled in a known manner to the measuring graduation 10 and to the scanning unit. These may for instance be machine parts, whose relative positions to one another must be detected precisely. The displacement-dependent scanning signals and position data generated by the position measuring instrument are further processed, for instance for controlling the machine, by a downstream electronic unit or evaluation unit—not shown.

The position measuring instrument in the present exemplary embodiment is embodied as a high-resolution interferential position measuring instrument for detecting linear motion and may be used for instance in machinery of the kind employed in semiconductor production.

Figure 1:
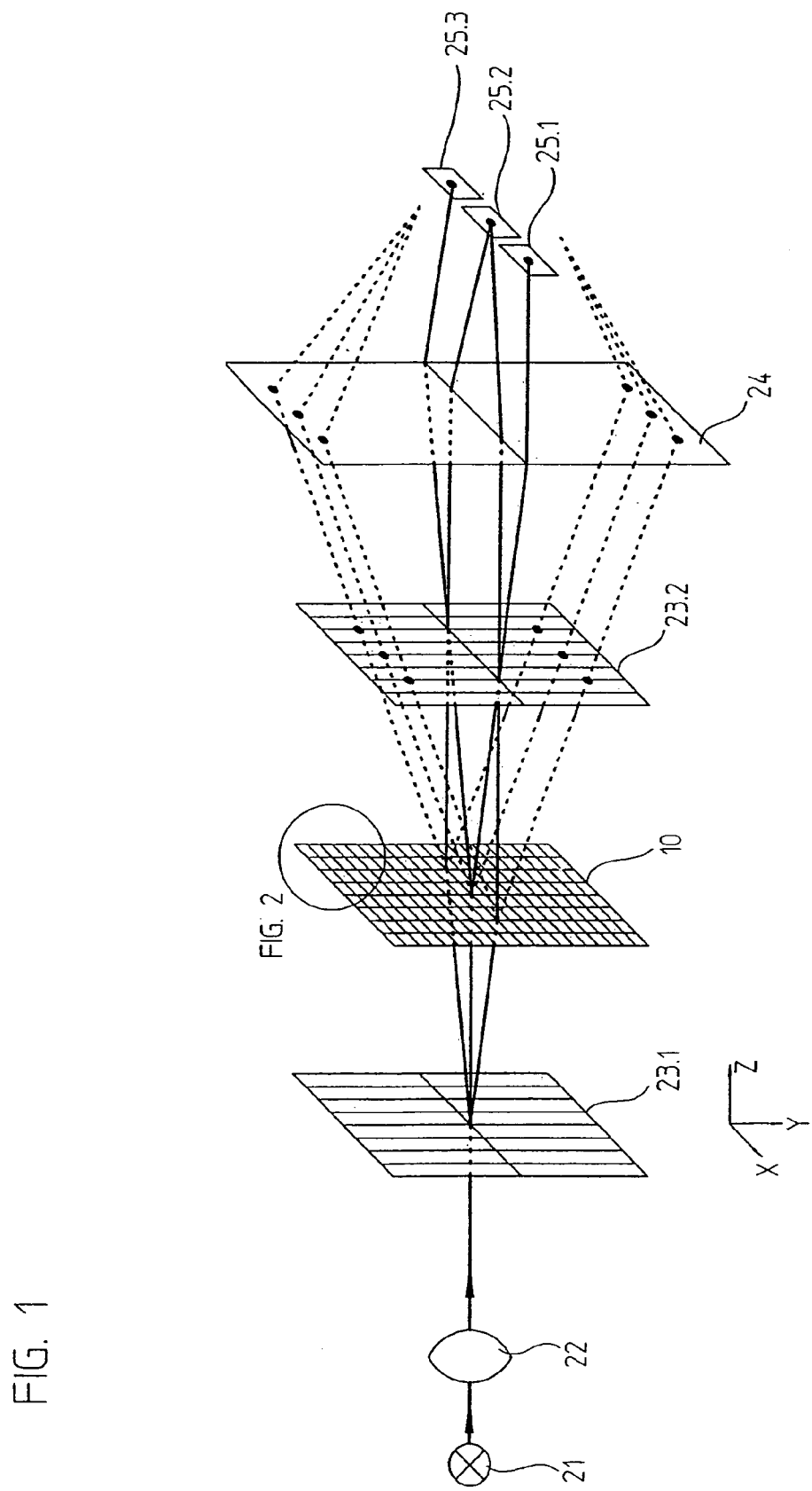
FIG. 1 is a schematic illustration of a possible scanning beam path of a first embodiment of a position measuring instrument in accordance with the present invention.

Only a part of the measuring graduation 10 is shown in FIG. 1. The measuring graduation 10 as a rule extends over the required measurement distance in the measuring direction x. In the present example, the measuring graduation 10 is embodied as a linear measuring graduation 10—or as a linear scale. The measuring graduation 10 includes graduation areas, located periodically in the measuring direction x, that have different optical properties. In the case of incident light scanning, for instance, alternating graduation areas with different reflection properties are provided, while conversely in the case of transmitted light scanning, alternating graduation areas with different transmission properties are provided, and so forth. The graduation areas with different optical properties extend along the indicated y direction. For further definitive details of the embodiment of the measuring graduation 10 see the following description of FIG. 2.

The basic scanning beam path of the exemplary embodiment shown will now be explained, it is substantially equivalent to the scanning beam path of a so-called interferential three-grating transducer.

In this example the bundled beams emitted by a light source 21 are first oriented parallel or collimated by an optical collimator element 22 and then strike the scanning grating 23.1, embodied as a transmitted light graduation. The scanning grating 23.1 has a graduation structure which is oriented in space exactly like that of the measuring graduation 10 and functions in a known manner as a splitting grating. As can be seen from FIG. 1, the incident bundled beam is split by the scanning grating 23.1 in three diffraction orders (0, +1, −1) and into the partial bundled beams in the x-z plane that propagate in the corresponding directions in space. These partial bundled beams then propagate in the direction of the measuring graduation 10, which in this example is embodied according to the present invention for efficient harmonic filtration, as will be described hereinafter in detail. At the measuring graduation 10, a further diffraction of the incident partial bundled beams takes place in the +/−1st orders of diffraction in the measuring direction x in the x-z plane. Because of the harmonic-filtering embodiment of the graduation areas as provided there, an additional diffraction of the incident partial bundled beams also takes place in the y-z plane at the measuring graduation 10. The resultant partial bundled beams are shown only schematically or in dashed lines in FIG. 1, since they are not further used to generate the incremental scanning signals. The partial bundled beams split in the x-z plane are then superimposed on one another again at the next scanning grating 23.2 in the scanning beam path. Therefore the scanning grating 23.2 in this functionality is also called a combining grating. Then three interfering pairs of partial bundled beams are propagated in the direction toward a downstream located lens 24, which focuses the three pairs of interfering partial bundled beams onto three opto-electronic detector elements 25.1, 25.2, 25.3 in the detection plane.

In the case of relative motion of the measuring graduation 10 in relation to the scanning unit, or the other components in FIG. 1, incremental scanning signals that are each phase-shifted by 120° result at the detector elements 25.1, 25.2, 25.3. The scanning signals represent a standard for the relative motion of the measuring graduation 10 and scanning unit and can be further processed in a known manner by downstream located electronic units.

The drawn-out view of the scanning beam path with the separate scanning grating 23.1 (splitting grating) and scanning grating 23.2 (combining grating), as well as a transmitted light measuring graduation, corresponds to a transmitted light variant of the position measuring instrument of the invention. As an alternative to this, an incident light variant of the same may also be embodied, in which the measuring graduation 10 is embodied as an incident light measuring graduation and the scanning grating 23.1 (splitting grating) and the scanning grating 23.2 (combining grating) are embodied as a common or identical grating structure, through which the light then passes twice. In principle, an incident light variant of this kind can be embodied more compactly than the transmitted light variant shown in FIG. 1.

To accomplish the desired filtration of harmonics out of the scanning signals, provisions are made in the example in FIG. 1 on the part of the measuring graduation 10. For a further explanation of these provisions see FIG. 2, which shows a detail of the measuring graduation 10 of FIG. 1 in a plan view. As can be seen from this plan view, the measuring graduation 10 has graduation areas 10.1, 10.2 with the measuring graduation period TP_M with different optical properties, located periodically in the measuring direction x. The graduation areas 10.1, 10.2 each extend perpendicular to the measuring direction x in the indicated extension direction y. The different optical properties of the graduation areas 10.1, 10.2 may, depending on the scanning principle, for instance be different reflection properties, different transmission properties, or different phase-shifting effects on the partial bundled beams striking them.

Figure 2:
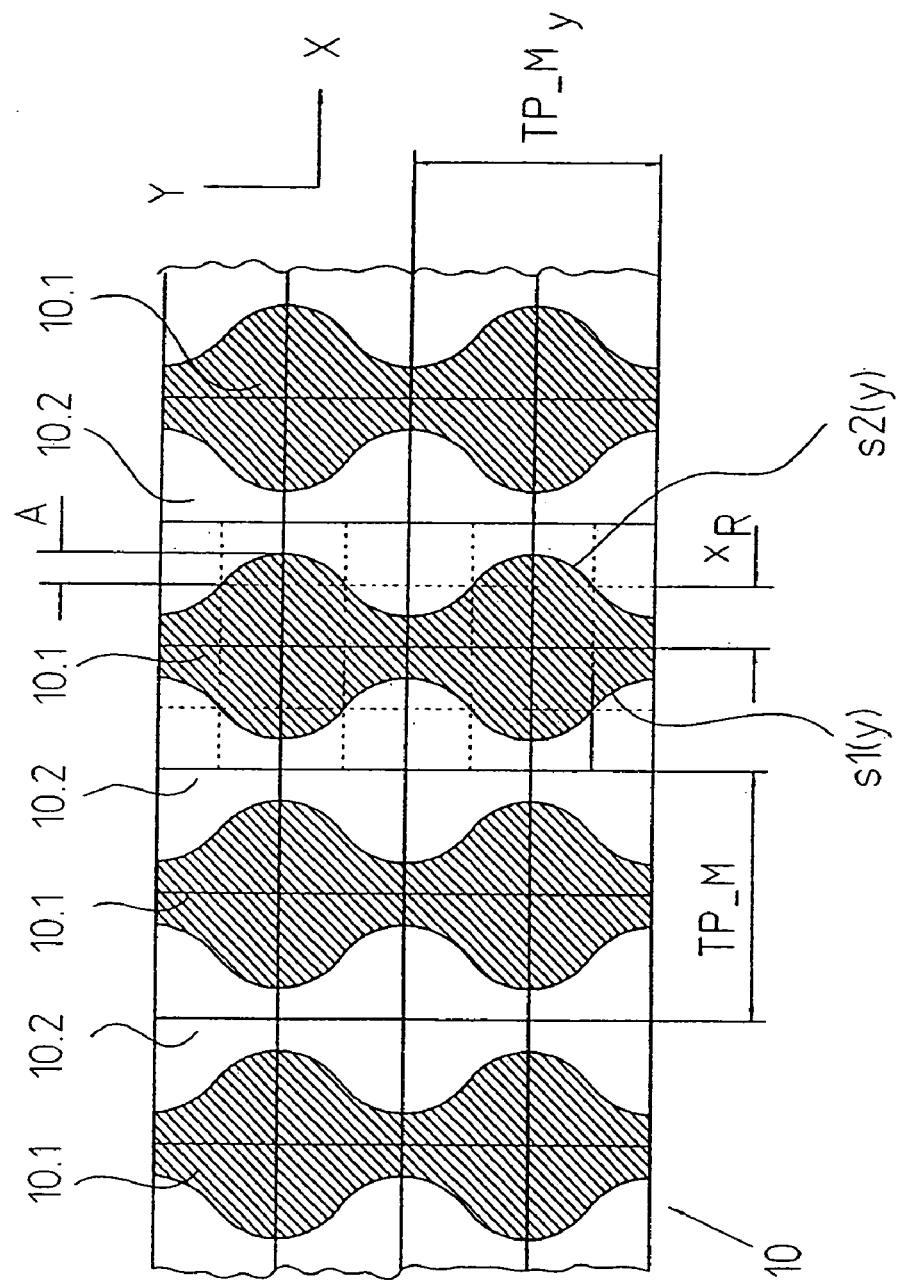
FIG. 2 is an enlarged fragmentary view of an embodiment of a measuring graduation to be used with the position measuring instrument of FIG. 1 in accordance with the present invention.

A measuring graduation 10 which in transmitted light or in reflection generates essentially only +/−1st orders of diffraction and suppresses the 0th order of diffraction proves especially advantageous, so that essentially only +/−1st orders of diffraction contribute to generating the displacement-dependent scanning signals. The higher orders of diffraction in the scanning beam path should be eliminated to suppress unwanted harmonics in the scanning signal, because their interference causes such harmonics. According to the present invention, this can be accomplished if the graduation areas 10.1 of the measuring graduation 10 have differentiable contour shapes $s1(y)$, $s2(y)$ along their extension direction y, which are dimensioned such that by them unwanted harmonic components can be eliminated from the resultant scanning signals. For this purpose, as shown in the example of FIG. 2, a harmonic modulation of the contour shapes of the graduation areas 10.1 is advantageously provided in the form of a periodic, sinusoidal contour shape or contour edge with no sharp points or sharp edges for the two long sides of the graduation areas 10.1.

In view of the periodicity $TP\_M_y$ of the contour shapes $s1(y)$, $s2(y)$ in the extension direction y, it must be noted that as a result of this transversal substructure, as already indicated above, an additional transversal deflection effect for the partial bundled beams striking it in the y-z plane results. By the suitable choice of the periodicity $TP\_M_y$ of the differentiable contour shapes $s1(y)$, $s2(y)$, this deflection action can be adjusted in a defined way. In the example of FIG. 1, the periodicity $TP\_M_y$ of the contour shapes $s1(y)$, $s2(y)$ is selected such, that the partial bundled beams, deflected by it transversely to the measuring direction x, do not strike those particular opto-electronic detector elements 25.1 to 25.3 in the detection plane that are used to generate the phase-shifted scanning signals. In one embodiment, the partial bundled beams are prevented from being deflected in this way so as to prevent the beams from striking detector elements that are possibly used to generate reference pulse signals.

In principle, the periodicity TP_My could alternatively be selected such that the transversely deflected partial bundled beam areas are guided in a targeted way onto a suitable detector element used to generate a constant light signal. A constant light signal of this kind could for instance be used in a known way to regulate the intensity of the illumination, or to set the width of the reference marks.

In general, the periodicity $TP\_M_y$ of the contour shapes $s1(y)$, $s2(y)$ should be selected such that the partial bundled beams deflected transversely by them will cause no interference with the position-relevant scanning signals. To that end, screens may for instance also be located at suitable points along the scanning beam path. Alternatively, it can be provided that the partial bundled beams deflected by them in principle do not strike optoelectronic detector elements in the detection plane used to generate a plurality of phase-shifted incremental signals.

For a measuring graduation period TP_M provided in the measuring direction x, a description in terms of an equation will be given below for suitable differentiable contour shapes $s1(y)$, $s2(y)$. Here, in accordance with FIG. 2, $s1(y)$ describes the left-hand contour shape of the graduation areas 10.1, while $s2(y)$ describes the right-hand contour shape of the graduation areas 10.1.

In order to eliminate especially the interfering third harmonic components in the scanning signals, the following contour shapes $s1(y)$, $s2(y)$ prove to be especially advantageous:

$$s1(y) = -x_R - A^*\sin(2\pi^* y/TP\_M_y) \quad \text{(Eq. 1.1)}$$

$$s2(y) = +x_R + A^*\sin(2\pi^* y/TP\_M_y + \phi) \quad \text{(Eq. 1.2)}$$

wherein
  TP_M: measuring graduation period
  TP_M: periodicity of the contour shape in the extension direction y of the graduation areas.

The parameters $x_R$, A and $\phi$ from equations (1.1) and (1.2) are preferably selected as follows:

$$x_R = 0.25 * TP\_M$$

$$A = 0.1275 * TP\_M$$

$$\phi = 0.$$

With regard to the parameters $x_R$, A and $\phi$ and their clear interpretation with respect to the contour shapes $s1(y)$, $s2(y)$, see FIG. 2. As can be seen from this, these parameters define certain geometric variables of the contour shapes $s1(y)$, $s2(y)$ as a function of the respective measuring graduation period TP_M. While A here represents amplitude information pertaining to the sinusoidal contour shape $s1(y)$ or respectively $s2(y)$, $x_R$ is a standard for the offset of the contour shape with respect to the axis of symmetry of the graduation areas 10.1. As shown in FIG. 2, $x_R$ is the distance the inflection points (second derivative equals 0) of the curve shapes $s1(y)$, $s2(y)$ are from the symmetry axis. The parameter $\phi$ (for instance with the selected value of $\phi=0°$ or $\phi=180°$) describes the offset of the left and right contour shapes $s1(y)$, $s2(y)$ from one another in the extension direction y.

Unlike the prior art discussed at the outset, the differentiable contour shapes $s1(y)$, $s2(y)$ designed according to the invention now do not have any sharp points or sharp edges in particular, which from a production standpoint are difficult to manipulate. Instead, the differentiable contour shapes $s1(y)$, $s2(y)$ according to the present invention can be produced simply and precisely, using known lithographic techniques.

For a position measuring instrument with a measuring graduation that is scanned by incident light, the following parameters have for instance been chosen:

TP_M=4 µm $TP\_M_y$=4 µm $x_R$=1 µm

A=0.51 µm 0

$\phi$=0.

The measuring graduation 10 is embodied here as an incident light phase grating, in which the graduation areas 10.1, 10.2 differ in their phase-shifting effect. Upon reflection at the measuring graduation 10, a phase shift of 180° ensues.

Besides the described first exemplary embodiment of a position measuring instrument of the present invention, a number of further alternatives exist within the scope of the present invention.

As an alternative to the variant just now described, for instance, a scanning graduation in the scanning beam path could also be embodied on the basis of the considerations explained.

Moreover, it is not compulsory that all the components except for the measuring graduation in the examples in FIG. 1 be associated directly with the scanning unit. For instance, the light source and/or the detector elements could also be located outside or spatially separated from the scanning unit, and the coupling of these elements could be done by optical waveguides.

It is furthermore possible, as an alternative to an embodiment as an incident light phase grating, to use an amplitude grating as the measuring graduation, which grating has alternating graduation areas with different optical absorption and reflection properties for the incident bundled beams.

Figure 3:
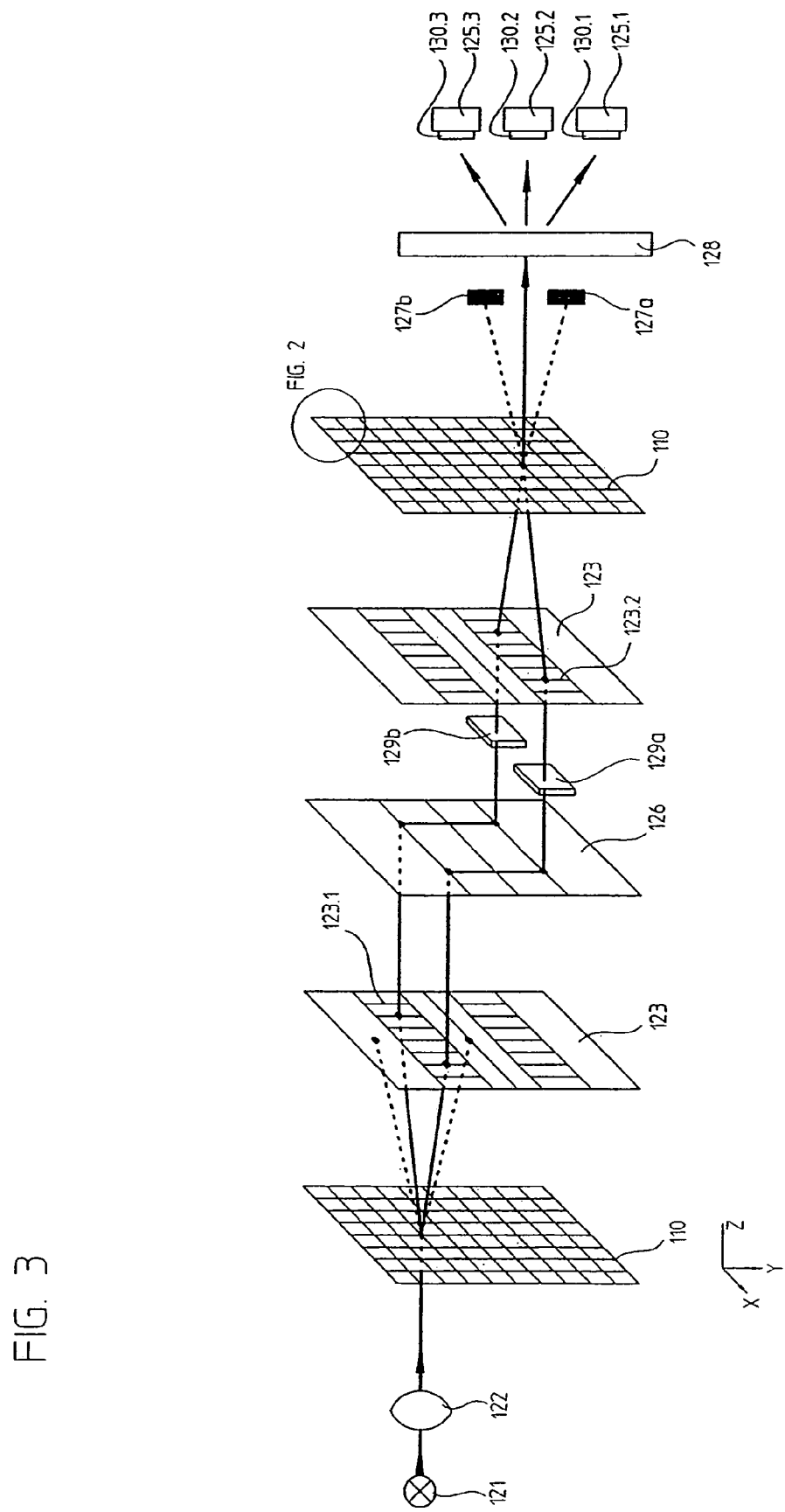
FIG. 3 is a schematic illustration of a possible scanning beam path of a second embodiment of a position measuring instrument in accordance with the present invention.

A further embodiment of the position measuring instrument of the present invention will now be described in conjunction with the schematic view in FIG. 3. This variant differs from the first example in having a modified scanning beam path. With regard to the embodiment of the measuring graduation, which again filters out harmonics, see the above descriptions.

For the sake of greater clarity, in this example the scanning beam path is shown in a drawn-out view as well. In practice, this variant of the position measuring instrument of the present invention is preferably embodied as an incident light system, with a measuring graduation used in reflection in a reflection mode.

In contrast to the previous example, now the bundled beam emitted by the light source 121 and collimated and linearly polarized via the optical collimator element 122 (which includes a polarization element, such as a linear polarization plate) initially strikes the measuring graduation 110 a first time, where a diffraction in different directions in space takes place. The partial bundled beams diffracted in the various directions in space in the x-z plane then reach a first region 123.1 of the scanning grating 123, which is embodied as a transmitted light graduation, and a new diffraction results there. The partial bundled beams (shown in dashed lines) diffracted into the y-z plane as a result of the transversal structure of the harmonics-filtering measuring graduation 110 are no longer used for generating the scanning signals and strike optically inactive regions of the scanning grating 123. These partial bundled beams are no longer used for generating the scanning signals. The partial bundled beams diffracted once again at the scanning grating 123 then strike a schematically indicated retroreflector element 126, for instance embodied as a ridge prism, and are reflected back by it, with a certain lateral offset in the y direction, into the incident direction again, that is, the direction of the scanning grating 123. Prior to the scanning grating 123, the partial bundled beams pass through two λ/4 plates 129a, 129b, rotated 90° from one another, which convert the linearly polarized partial bundled beams into circularly polarized partial bundled beams. At the scanning grating 123, the partial bundled beams then pass through a second partial region 123.2 before reaching the measuring graduation 110 a second time, where they are again reflected with diffraction. Finally, from the measuring graduation 110, the partial bundled beams are propagated again in the direction of the scanning grating 123, before the interfering partial bundled beams that are used for generating signals strike the optoelectronic detector elements 125.1, 125.2, 125.3, where, in the event of relative motion of the measuring graduation 110 and the scanning unit, the displacement-dependent scanning signals result. The partial bundled beams (shown in dashed lines) in the y-z plane that also result in the second diffraction at the measuring graduation 110 are not further used to generate the scanning signals and are suitably suppressed by schematically shown screens 127a, 127b. However, the bundled beams that are further used for generating scanning signals in this example then strike a downstream, schematically shown splitting grating 128, which generates three partial bundled beams that are propagated in three different directions in space. The three partial bundled beams then strike respective analyzers 130.1, 130.2, 130.3, rotated by 60° from each other, that have detector elements 125.1, 125.2, 125.3 located downstream of them. Finally, three scanning signals, phase-offset by 120°, are generated by the analyzers 130.1-130.3, which in the event of relative motion of the scale and the scanning unit are detected by the detector elements 125.1, 125.2, 125.3.

As in the previous example, once again the measuring graduation 110 is intended for filtering unwanted harmonic components and is embodied as described above. See the above descriptions for this.

Within the scope of the present invention, position measuring instruments with the most various scanning beam paths can accordingly be embodied in such a way that the desired harmonic filtration results.

The foregoing description is provided to illustrate the present invention, and is not to be construed as a limitation. Numerous additions, substitutions and other changes can be made to the present invention without departing from its scope as set forth in the appended claims.

I claim:

1. A position measuring instrument for detecting a relative position, the position measuring instrument comprising:
    a scale comprising a measuring graduation extending in a measuring direction;
    a scanning unit that can be moved in said measuring direction in relation to said scale so as to generate a resultant scanning signal, wherein said scanning unit comprises a scanning graduation arranged on a side of said scanning unit;
    wherein either said measuring graduation or said scanning graduation comprises graduation areas located periodically in said measuring direction, said graduation areas extend perpendicular to said measuring direction along an extension direction, and said graduation areas have differentiable contour shapes along said extension direction that define entire boundaries of said graduation areas along said extension direction, said contour shapes being entirely differentiable along said extension direction and are dimensioned such that unwanted harmonic components can be eliminated from said resultant scanning signal by way of them.

2. The position measuring instrument in accordance with claim 1, wherein said contour shapes are dimensioned such that partial bundled beams, transversely deflected via said contour shapes, do not cause any interference with said resultant scanning signal.

3. The position measuring instrument in accordance with claim 2, wherein said contour shapes are dimensioned such that said partial bundled beams strike non-transparent screens in a scanning beam path.

4. The position measuring instrument in accordance with claim 2, wherein said contour shapes are dimensioned such that said partial bundled beams do not strike optoelectronic detector elements in a detection plane, which are used to generate a plurality of phase-shifted incremental signals.

5. The position measuring instrument in accordance with claim 1, wherein said contour shapes are embodied essentially sinusoidally.

6. The position measuring instrument in accordance with claim 1, wherein said graduation areas of said measuring graduation have contour shapes along both their long sides in said extension direction in accordance with the following equations:

$$s1(y) = -x_R - A*\sin(2\pi*y/TP\_M_y)$$

$$s2(y) = +x_R + A*\sin(2\pi*y/TP\_M_y + \phi)$$

wherein

TP_M: measuring graduation period

TP_$M_y$: periodicity of the contour shape in the extension direction y of the graduation areas.

7. The position measuring instrument in accordance with claim 6, wherein said parameters $x_R$, A and $\phi$ are selected as follows:

$$x_R = 0.25*TP\_M$$

$$A = 0.1275*TP\_M$$

$$\phi = 0$$

8. The position measuring instrument of claim 1, wherein said measuring graduation diffracts essentially only in +/−1st orders of diffraction in said measuring direction, and in particular suppresses a $0^{th}$ order of diffraction.

9. The position measuring instrument of claim 1, wherein said scanning unit further comprises:

a light source emitting a bundled beam of light;

a lens; and a plurality of optoelectronic detector elements which are located such that said bundled beam of light:

initially strikes said scanning grating, embodied as a transmitted light graduation, which causes a split into a first plurality of diffracted partial bundled beams, which propagate in a direction toward said measuring graduation;

wherein at said measuring graduation another diffraction in a plurality of directions in space results into a second plurality of diffracted partial bundled beams that are propagated in a direction toward said scanning grating; and in said scanning unit, said second plurality of diffracted partial bundled beams, after passing as interfering pairs of partial bundled beams through said scanning grating via said lens, strike three detector elements, at which, in the event of relative motion of said measuring graduation and said scanning unit, phase-displaced scanning signals modulated as a function of displacement result.

10. The position measuring instrument in accordance with claim 9, wherein said scale is embodied as an incident light scale, whose measuring graduation includes graduation areas, located periodically in said measuring direction, with different optical reflection properties.

11. The position measuring instrument in accordance with claim 9, wherein said scale is embodied as a reflection phase grating.

12. The position measuring instrument of claim 1, wherein said scanning unit comprises:

a light source emitting a bundled beam of light;

a polarization element that receives said bundled beam of light and generates a linearly polarized bundled beam of light;

a splitting grating; and a plurality of optoelectronic detector elements, which are located such that said linearly polarized bundled beam of light:

initially strikes said measuring graduation, embodied as an incident light measuring graduation, and is reflected by said measuring graduation, where splitting into linearly polarized partial bundled beams of different orders of diffraction takes place;

said linearly polarized partial bundled beams reflected by said measuring graduation then strike said scanning grating, embodied as a transmitted light graduation, and then are propagated at least partly toward a retroreflector element;

from said retroreflector element, a deflection of said linearly polarized partial bundled beams, which struck said scanning grating, toward said scanning grating takes place; and said linearly polarized partial bundled beams from said retroreflector element then pass through two $\lambda/4$ plates rotated by 90° to one another, which convert said linearly polarized partial bundled beams into circularly polarized partial bundled beams;

said circularly polarized partial bundled beams, after the ensuing passage through said scanning grating, strike said measuring graduation a second time, and after a second reflection are again propagated toward said scanning unit; and in said scanning unit, said circularly polarized partial bundled beams undergo said second reflection, after passing through said splitting grating, result in three partial bundled beams, which then pass through three analyzers, rotated by 60° to one another, downstream of which said optoelectronic detector elements are located and at which, in the event of relative motion of said scale and said scanning unit, phase-displaced scanning signals modulated as a function of displacement result.

13. The position measuring instrument in accordance with claim 12, wherein said scale is embodied as an incident light scale, whose measuring graduation includes graduation areas, located periodically in said measuring direction, with different optical reflection properties.

14. The position measuring instrument in accordance with claim 12, wherein said scale is embodied as a reflection phase grating.

* * * * *